Jan. 6, 1953

H. G. BEVERMAN
DUCK DECOY SUPPORT 2,624,144

Filed April 15, 1949

INVENTOR.
HARRY G. BEVERMAN

BY
McMorrow, Berman & Davidson
ATTORNEYS

Jan. 6, 1953  H. G. BEVERMAN  2,624,144
DUCK DECOY SUPPORT
Filed April 15, 1949  2 SHEETS—SHEET 2
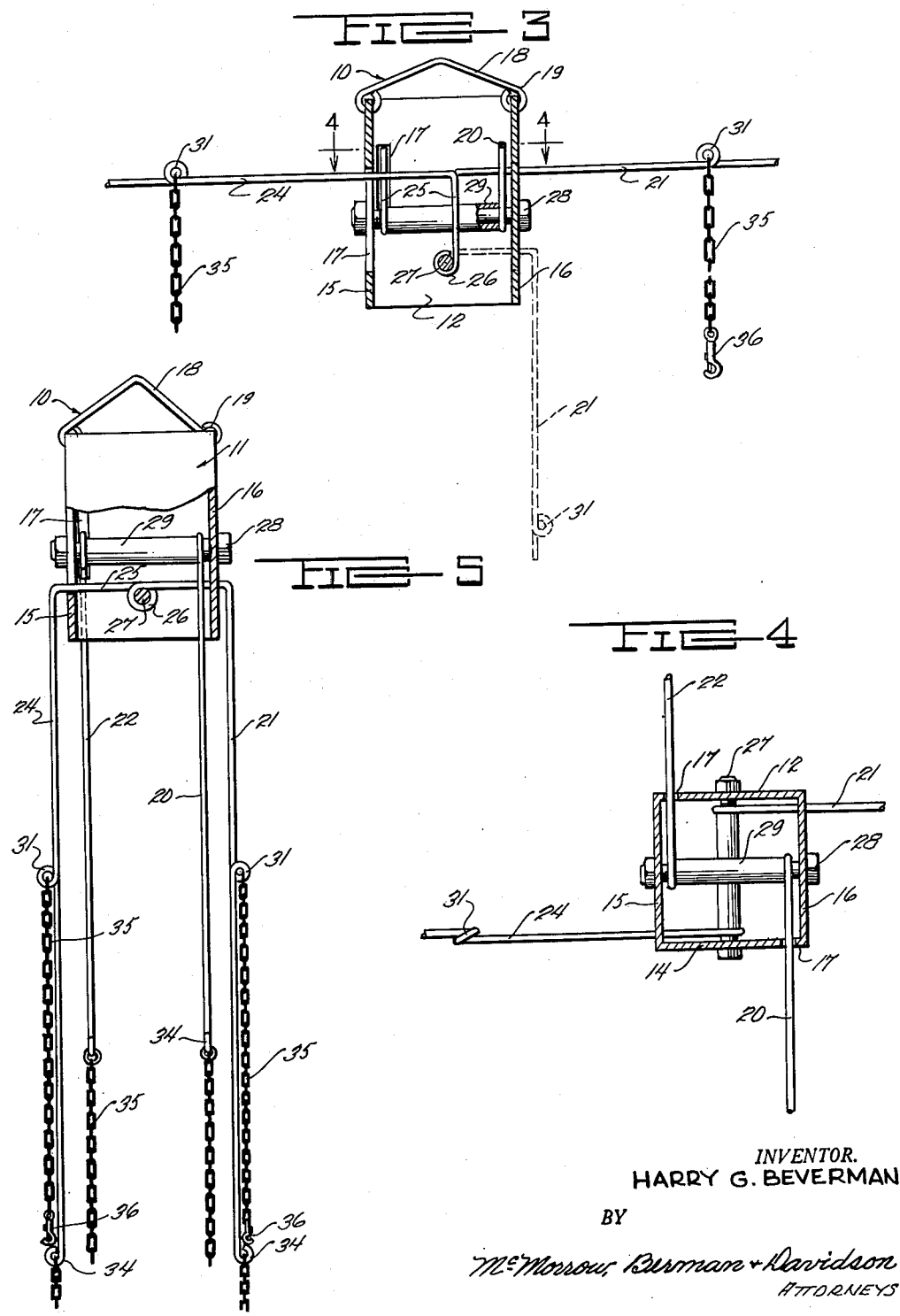
INVENTOR.
HARRY G. BEVERMAN
BY
McMorrow, Berman & Davidson
ATTORNEYS Patented Jan. 6, 1953

2,624,144

UNITED STATES PATENT OFFICE 2,624,144

DUCK DECOY SUPPORT

Harry G. Beverman, Lincoln, Ill., assignor to Pearl Beverman, Lincoln, Ill., and F. G. Whiteside, Springfield, Ill., jointly Application April 15, 1949, Serial No. 87,655

3 Claims. (Cl. 43—3)

This invention relates to a folding decoy device, and more particularly to a folding decoy-arranging device for floating decoys.

It is an object of this invention to provide a decoy-arranging device of the kind to be more particularly described hereinafter for securing a plurality of floating decoys to a common supporting member with the decoys in a floating, widely-spaced-apart arrangement, the device being foldable about a common support to provide a compact arrangement of the decoy-supporting means for carrying and storing in a limited space, as for transportation.

Another object of this invention is to provide a decoy-supporting and arranging device having quickly and easily-removable decoys attached thereto, the supporting device being immediately extensible to a fully-extended position when left buoyant in the water, and gravitationally retractible upon removal from the water.

A further object of this invention is to provide a decoy device of this kind which is normally positioned below the surface of the water to be concealed thereby and supported in its concealed position by the floating decoys fastened thereto. The device, being buoyantly supported, may be readily moved about in the water, and as the decoys are secured to the device by flexible connecting means, the decoys will trail the movement of the device in a lifelike, milling manner.

Still another object of this invention is to provide a decoy device of this kind enabling the setting out of six decoys in the same short time ordinarily required for one. The same saving of time is realized in gathering up the decoys when the hunter is ready to leave. The use of a device of this kind eliminates the discomfort of having to wrap cold, wet cords about the decoys when removing them from the water. This is the type of chore every hunter would like to avoid and is adequately provided for in the structure of this folding decoy-supporting and arranging device.

With the above and other objects in view, my invention consists in the arrangement, combination and details of construction disclosed in the drawings and specification, and then more particularly pointed out in the appended claims.

In the drawings:

Figure 3 is a fragmentary vertical section, taken on the line 3—3 of Figure 1;

Figure 4 is a fragmentary horizontal section, partly broken away, taken on the line 4—4 of Figure 3;

Figure 5 is a side elevation, partly broken away and partly in section, of the decoy-supporting and arranging device in its retracted or folded position.

Figure 1:
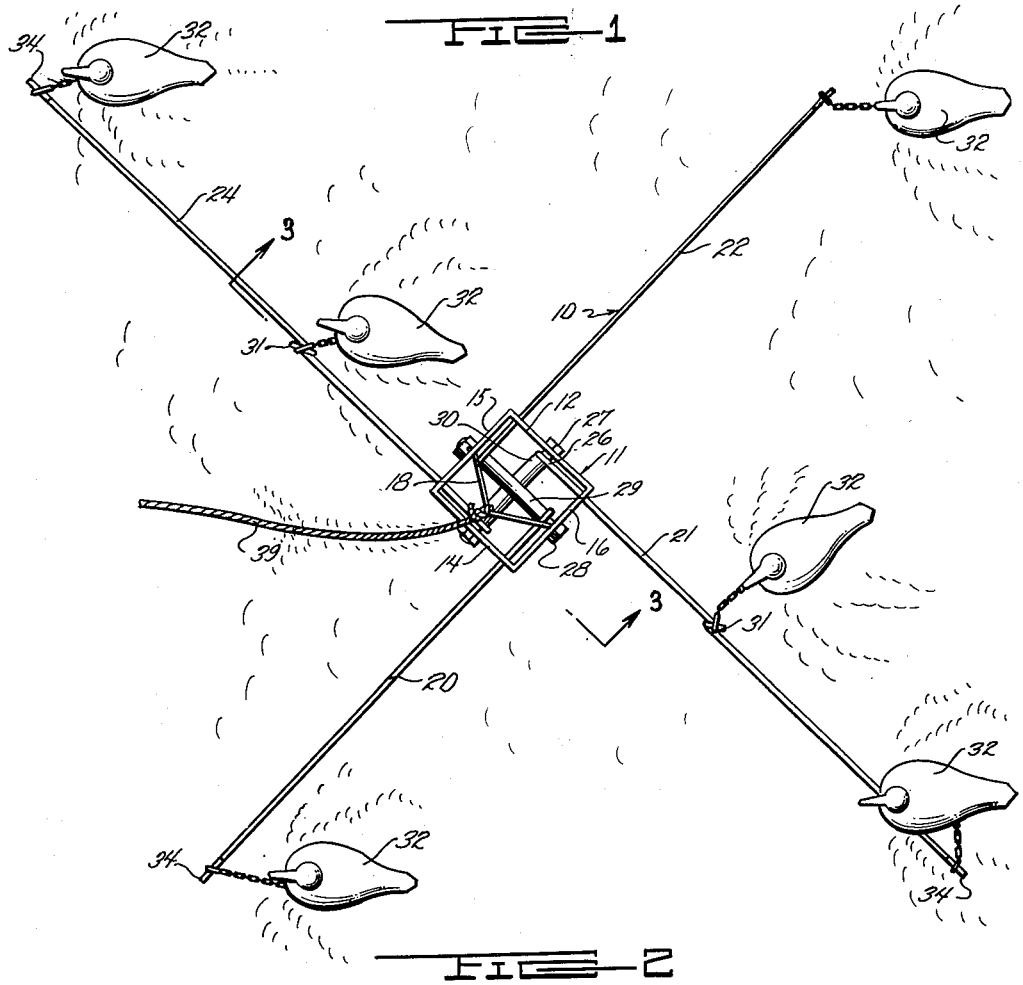
Figure 1 is a top plan view of a folding decoy-supporting and arranging device, constructed according to an embodiment of my invention.
Figure 2:
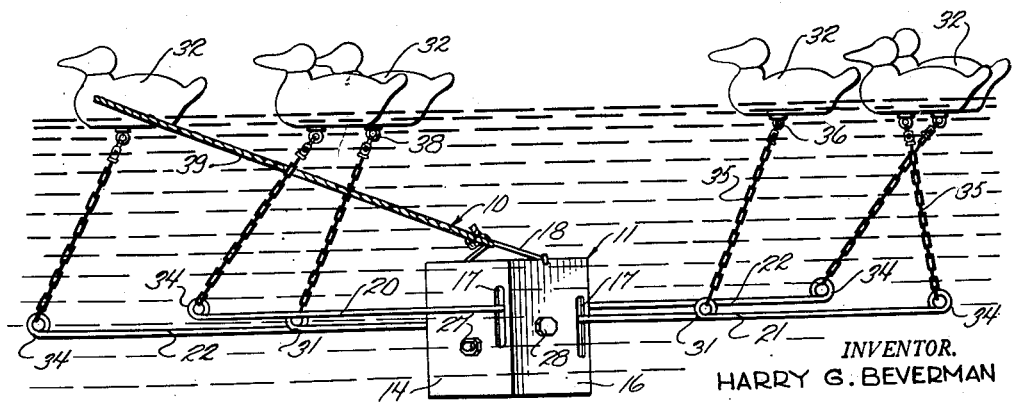
Figure 2 is a side elevation thereof.

Referring to the drawings, the numeral 10 designates generally a floating decoy-supporting and arranging device constructed according to an embodiment of my invention, which may be folded from and extended floating position to a compact retracted or folded position. The decoy-supporting and arranging device comprises a central supporting member 11 which is formed as a hollow housing open at the opposite ends thereof. The housing 11 is adapted to be supported in the water in a vertical position, with the bottom and top being open, the side walls being disposed in right-angularly related planes.

The side walls 12, 14, 15 and 16 constitute the open ended multi-sided housing 11 and the central supporting member for the decoy-supporting and arranging device. Each of the side walls 12, 14, 15 and 16 is formed with a longitudinal elongated opening 17. The openings 17 are disposed in a vertically-extending position on one side edge of each of the walls to provide room for the swinging of the decoy-supporting rods, to be described hereinafter.

As the housing 11 is formed, in the drawings, of four side walls, as the openings 17 are on one side edge of the walls, an opening 17 will be disposed at each of the corners of the housing. A bail 18 is pivotally mounted on the upper edges of a pair of opposed walls, as the walls 15 and 16. The bail 18 may be made of wire or other suitable material having eyes 19 formed at the opposite ends thereof which are engageable in openings adjacent the upper edges of the side walls for pivotally securing the opposite ends of the bail 18 therein. The bail 18 provides a suitable carrying handle for the decoy-supporting and arranging device, and also provides a means for attaching one of the decoys when the device 10 is to be anchored in a selected place.

A rod extends through each of the sides or side walls 12, 14, 15, 16 of the open ended multi-sided housing 11 and has one end mounted in the housing for movement from its extended position to a position parallel to the adjacent side of the housing. Specifically, a plurality of elongated, rigid supporting members or rods 20, 21, 22 and 24 are pivotally connected within the housing 11 and extend through the openings 17 in each of the side walls 14, 16, 12 and 15, respectively. Each of the rigid supporting rods is formed with an inner end which is bent at right angles to the major length of the rod, which extends from the housing 11. The extreme inner ends of the rods and also the inner end of the right-angularly formed section, as the section 25 on the upper end of the rod 24 are formed with an eye, as the eye 26, for engagement with a pivot pin frictionally mounted within the housing 11. As each of the rods 20, 21, 22 and 24 is formed in substantially the same manner with a right-angularly formed inner end or arm 25, a full description of one of the rods and arm 25 will be applicable to each of the other rods.

A pair of pivot pins 27 and 28 are fixed between opposite side walls of the housing 11. The pin 27 is engaged between the side walls 12 and 14, while the pivot pin 28 is fixed between the side walls 16 and 15. Each of the pins 27 and 28 is free and separate from the other pin and as the pins would intersect each other within the housing 11, if they were disposed in the same plane, one of the pins, such as the pin 28, is mounted between the walls 15 and 16 above the pin 27. A close-fitting bushing or sleeve 29 is loosely disposed about the pin 28 within the housing 11 and a similar bushing 30 is disposed about the pin 27 within the housing below the bushing or sleeve 29. The sleeves 29 and 30 are of a length slightly less than the distance between the opposite side walls between which they are to be engaged to provide for the disposition of the eyes 26 at the opposite ends thereof between the ends of the sleeves and the inner surfaces of the side walls.

The short arms 25 on the inner end of each of the elongated supporting rods 21, 20, 22 and 24, are of a length slightly greater than the distance between the hinge pins 28 and the respective side walls on the opposite sides thereof, so that the supporting rods may be pivoted on the pins from a position parallel to the adjacent side of the housing to its extended position.

Certain of the supporting rods, as the rods 21 and 24, are formed with a loop, as the loop 31, intermediate the length thereof to which a decoy, as the decoys 32, may be loosely engaged. Each of the rods or supporting members is formed with an eye 34 at the extreme outer end thereof for attachment of a decoy.

The floating decoy-supporting and arranging device 10 is provided for attachment to a plurality of floating and buoyant decoys 32 and is adapted to be supported by the decoys in the extended position of the supporting device. A flexible element or member, as the chain 35, is fixed at one end to each of the eyes 31 and 34 of each of the supporting rods and a resilient, releasable fastening element, as the element 36, is fixed to or carried by the extreme other or free end of the flexible connecting member 35. Each of the decoys 32 is provided with a loop or hook, as the hook 38, on the bottom thereof, with which the releasable fastening member 36 may be engaged.

In the use and operation of the folding decoy-supporting and arranging device, the elongated supporting rods 20, 21, 22 and 24 are initially disposed in a retracted position, as the position shown in Figure 5 of the drawings. In the retracted position the arms 25 are disposed in a substantially horizontal position extending outwardly from the pivot pins 27 and 28. The major length of the supporting rods will be extended in a vertical position depending from the housing 11 in a compact, overlying relation to each other. As the decoys 32 may be releasably connected with the chains or flexible members 35, in the storage and transportation of the folding device 10, the decoys 32 will normally be disengaged from the fastening elements 36. Preparatory to using the device 10 as a decoy-supporting and arranging device in a body of water, each of the decoy members or elements 32 is connected to a respective fastening element 36. In the retracted position of the device 10, when it is placed in the water, the buoyancy of the decoy elements 32 will extend the arms 20, 21, 22 and 24 about their respective pivot pins, so that the inner arms 25 will be disposed in a vertically-arranged position, as clearly shown in Figure 3, and the major length of the rods will be disposed in a horizontal position. The arms and body or housing 11 are preferably formed of metal or other suitable material which is not buoyant and will sink below the surface of the water. As the decoys 32 are of a suitable buoyant characteristic, the decoy-supporting and arranging device 10 will be supported below the surface of the water in a substantially concealed position.

The entire device 10 may be moved from one position to another by engaging a suitable flexible towing member 39 to the bail 18 for moving the entire extended device 10 from one position in the water to another. As the rods 20, 21, 22 and 24 may be of various lengths and have a different number of decoy elements 32 supported on each of the rods, the movement of the entire device will effect the milling movement of the decoy elements 32 about the center of the central supporting member 11 in a normal, substantially lifelike manner as a plurality of ducks or other water fowl.

If the device 10 is desired to be placed in a fixed position, an anchor may be connected to the towing member 39 and the movement of the water about the anchored decoy elements 32 will give the appearance of a plurality of ducks milling about in the water.

I do not mean to confine myself to the exact details of construction herein disclosed, but claim all variations falling within the purview of the appended claims.

I claim:

1. A foldable supporting and arranging device comprising a first pair of side walls arranged in parallel spaced relation, a first pin extending transversely between said pair of side walls intermediate the ends of the latter and fixedly secured to said pair of side walls, a first bushing loosely circumposed about said pin, said bushing having each end spaced from the adjacent one of said pair of side walls, a rod extending transversely through a wall of a second pair of side walls and having one end interposed in the space between the adjacent end of said bushing and one of said first side walls and connected to the portion of said pin defined by said space for movement from its extended transverse position to a position parallel with the adjacent one of said pair of side walls, said second pair of side walls being arranged in parallel spaced relation positioned transversely of and between said first pair of side walls and secured to the latter, a second pin extending transversely between said second pair of side walls intermediate the ends of the latter and fixedly secured to said second pair of side walls, said second pin being spaced from said first pin, a second bushing loosely circumposed about said second pin, said second bushing having each end spaced from the adjacent one of said second pair of side walls, a rod extending transversely through each wall of said first pair of side walls and having one end interposed in the space between the adjacent end of said second bushing and one wall of said second pair of side walls and connected to the portion of said second pin defined by the last named space for movement from its extended transverse position to a position parallel with the adjacent one of said second pair of side walls, and means on the other end of each of said rods for attachment of a decoy thereto.

2. A foldable supporting and arranging device comprising a first pair of side walls arranged in parallel spaced relation, a first pin extending transversely between said pair of side walls intermediate the ends of the latter and fixedly secured to said pair of side walls, a first bushing loosely circumposed about said pin, said bushing having each end spaced from the adjacent one of said pair of side walls, a rod extending transversely through a wall of a second pair of side walls and having one end interposed in the space between the adjacent end of said bushing and one of said first side walls and connected to the portion of said pin defined by said space for movement from its extended transverse position to a position parallel with the adjacent one of said pair of side walls, said second pair of side walls being arranged in parallel spaced relation positioned transversely of and between said first pair of side walls and secured to the latter, a second pin extending transversely between said second pair of side walls intermediate the ends of the latter and fixedly secured to said second pair of side walls, said second pin being spaced from said first pin, a second bushing loosely circumposed about said second pin, said second bushing having each end spaced from the adjacent one of said second pair of side walls, a rod extending transversely through each wall of said first pair of side walls and having one end interposed in the space between the adjacent end of said second bushing and one wall of said second pair of side walls and connected to the portion of said second pin defined by the last name space for movement from its extended transverse position to a position parallel with the adjacent one of said second pair of side walls, means on the other end of each of said rods for attachment of a decoy thereto, and a second means on at least two of said rods and spaced from said first named means for attachment of a further decoy thereto.

3. A foldable supporting and arranging device comprising a first pair of side walls arranged in parallel spaced relation, a first pin extending transversely between said pair of side walls intermediate the ends of the latter and fixedly secured to said pair of side walls, a first bushing loosely circumposed about said pin, said bushing having each end spaced from the adjacent one of said pair of side walls, a rod extending transversely through a wall of a second pair of side walls and having one end interposed in the space between the adjacent end of said bushing and one of said first side walls and connected to the portion of said pin defined by said space for movement from its extended transverse position to a position parallel with the adjacent one of said pair of side walls, said second pair of side walls being arranged in parallel spaced relation positioned transversely of and between said first pair of side walls and secured to the latter, a second pin extending transversely between said second pair of side walls intermediate the ends of the latter and fixedly secured to said second pair of side walls, said second pin being spaced from said first pin, a second bushing loosely circumposed about said second pin, said second bushing having each end spaced from the adjacent one of said second pair of side walls, a rod extending transversely through each wall of said first pair of side walls and having one end interposed in the space between the adjacent end of said second bushing and one wall of said second pair of side walls and connected to the portion of said second pin defined by the last named space for movement from its extended transverse position to a position parallel with the adjacent one of said second pair of side walls, an eye on the other end of each of said rods for attachment of a decoy thereto, and a loop on at least two of said rods and spaced from said eye for attachment of a further decoy thereto.

HARRY G. BEVERMAN.

REFERENCES CITED

The following references are of record in the file of this patent:

UNITED STATES PATENTS

| Number | Name | Date |
|---|---|---|
| 30,069 | Lamb | Sept. 18, 1860 |
| 244,038 | Danz | July 12, 1881 |
| 481,942 | Foster | Sept. 6, 1892 |
| 710,433 | Coudon | Oct. 7, 1902 |
| 970,003 | Wethall | Sept. 13, 1910 |
| 1,329,985 | McNaughton | Feb. 3, 1920 |
| 1,424,564 | Goldsmith | Aug. 1, 1922 |
| 1,490,650 | Wagner | Apr. 15, 1924 |
| 2,469,494 | Bushko | May 10, 1949 |